(12) United States Patent
Raman et al.

(10) Patent No.: US 7,330,576 B2
(45) Date of Patent: Feb. 12, 2008

(54) QUANTIFICATION METHOD OF VESSEL CALCIFICATION

(75) Inventors: Raghav Raman, Cupertino, CA (US); Bhargav Raman, San Jose, CA (US); Sandy A. Napel, Menlo Park, CA (US); Geoffrey D. Rubin, Woodside, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 593 days.

(21) Appl. No.: 11/003,937

(22) Filed: Dec. 2, 2004

(65) Prior Publication Data

US 2005/0195936 A1 Sep. 8, 2005

Related U.S. Application Data

(60) Provisional application No. 60/526,790, filed on Dec. 3, 2003.

(51) Int. Cl.
*G06K 9/00* (2006.01)
(52) U.S. Cl. ..................... 382/128; 382/154
(58) Field of Classification Search ............. 382/128, 382/130, 131, 132, 154, 286; 128/922; 600/407, 600/425
See application file for complete search history.

(56) References Cited

U.S. PATENT DOCUMENTS

| | | | |
|---|---|---|---|
| 5,491,627 A | 2/1996 | Zhang et al. | 364/413.2 |
| 7,149,331 B1* | 12/2006 | Kaufman et al. | 382/128 |
| 2003/0176780 A1 | 9/2003 | Arnold et al. | 600/407 |
| 2004/0017936 A1 | 1/2004 | Gopinath et al. | 382/131 |
| 2004/0133094 A1 | 7/2004 | Becker et al. | 600/407 |
| 2006/0013460 A1* | 1/2006 | Dehmeshki | 382/131 |

OTHER PUBLICATIONS

Hoffman et al. (2003) in a paper entitled "Vascular calcification in ex vivo carotid specimens: precision and accuracy of measurements with multi-detector row CT" and published in Radiology 229:375-381.
Hopper et al. (2002) in a paper entitled "Comparison of electron—beam and ungated helical CT in detecting coronary arterial calcification by using a working heart phantom and artificial coronary arteries" and published in Radiology 222:474-482.
Hong et al. (2003) in a paper entitled "Coronary artery calcium: accuracy and reproducibility of measurements with multi-detector row CT-assessment of effects of different thresholds and quantification methods" and published in Radiology 227:795-801.
Hong et al. (2002) in a paper entitled "Coronary artery calcium: absolute quantification in nonenhanced and contrastenhanced multi-detector row CT studies" and published in Radiology 223:474-480.
Rumberger et al. (2003) in a paper entitled "A rosetta stone for coronary calcium risk stratification; Agatston, volume, and mass, scores in 11,490 individuals" and published in AJR Am. J. Roentgenol. 181:743-748.
Paik et al. (1998) in a paper entitled "Automated flight path planning for virtual endoscopy" and published in Med. Phys. 25:629-637.
Isgum et al in a paper entitled "Automated detection of calcifications in the aorta from CT scans of the abdomen. 3D computer-aided diagnosis" and published in Acad. Radiol 11:247-257.
Straka et al. (2003) in a paper entitled "Bone Segmentation in CT-Angiography Data Using a Probabilistic Atlas" and published in VMV 2003.
Shiffman et al. (1996) in a paper entitled "Semiautomated Editing of Computed Tomography Sections for Visualization of Vasculature" and published in Report pp. 1-12.
Shiffman et al. (2000) in a paper entitled "Medical Image Segmentation Using Analysis of Isolable-Contour Maps" and published in IEE Transactions on Medical Imaging vol. 19 No. 11.

* cited by examiner

*Primary Examiner*—Andrew W. Johns
(74) *Attorney, Agent, or Firm*—Lumen Intellectual Property Services, Inc.

(57) ABSTRACT

A method that allows the quantification of the true mass of a calcium fragment located along a vessel is provided. The method is independent of the level of arterial contrast enhancement, does not require protocol-specific or scanner-specific calibration scans, and allows a detailed analysis of calcium distribution patterns. For each identified calcium fragment, the average intensity and volume is determined as a function of a plurality of intensity thresholds. Using these determined values brightness volume products are calculated for each of the plurality of intensity thresholds. The mass of a calcium segment is subsequently obtained from the calculated brightness volume products extrapolated at zero intensity and reference calcium parameters. The mass and volume of the calcium fragments could be visualized with respect to a vessel in a computer display.

8 Claims, 5 Drawing Sheets

QUANTIFICATION METHOD OF VESSEL CALCIFICATION

CROSS-REFERENCE TO RELATED APPLICATIONS

This application is cross-referenced to and claims priority from U.S. Provisional Application 60/526,790 filed Dec. 3, 2003, which is hereby incorporated by reference.

STATEMENT REGARDING FEDERALLY SPONSORED RESEARCH OR DEVELOPMENT

The present invention was supported in part by grant numbers 5R01HL58915 and 1R01HL67194 both from the National Institutes of Health (NIH). The U.S. Government has certain rights in the invention.

FIELD OF THE INVENTION

The present invention relates generally to medical imaging. More particularly, the present invention relates to methods of quantifying vascular calcification.

BACKGROUND

Vascular calcifications have been associated with the development of regional vascular disease. The severity of aortoiliac calcification as seen on chest x-ray studies has been correlated with atherosclerotic risk factors, coronary artery disease, peripheral arterial disease and cardiovascular mortality. Aortoiliac calcification can be much more common than coronary calcification. The distribution of calcification in the aortoiliac system has been shown to vary significantly depending on age, sex and comorbidity. The occurrence of iliac calcification was also associated with an increased incidence of symptoms of intermittent claudication.

The speed and coverage of Computed Tomographic Angiography (CTA) allows the imaging of the arterial system in a single scan. This presents a unique opportunity to quantify vascular calcification in systemic arteries as a measure of the total atherosclerotic burden. Determining the quantity and distribution of calcium in each vessel could allow the investigation of the relationship between the distribution of vascular calcium and the occurrence of systemic vascular diseases including stroke, aneurysmal disease, mesenteric ischemia and lower extremity vascular disease.

Recently it has been suggested that quantifying the mass of calcium is more accurate and less variable than the classical Agatston score or the volume score (See e.g. Hoffmann et al. (2003) in a paper entitled "*Vascular calcification in ex vivo carotid specimens: precision and accuracy of measurements with multi-detector row CT*" and published in Radiology 229:375-381; Hopper et al. (2002) in a paper entitled "*Comparison of electron-beam and ungated helical CT in detecting coronary arterial calcification by using a working heart phantom and artificial coronary arteries*" and published in Radiology 222:474-482; Hong et al. (2003) in a paper entitled "*Coronary artery calcium: accuracy and reproducibility of measurements with multi-detector row CT-assessment of effects of different thresholds and quantification methods*" and published in Radiology 227:795-801; Hong et al. (2002) in a paper entitled "*Coronary artery calcium: absolute quantification in nonenhanced and contrastenhanced multi-detector row CT studies*" and published in Radiology 223:474-480 and/or Rumberger et al. (2003) in a paper entitled "*A rosetta stone for coronary calcium risk stratification: Agatston, volume, and mass scores in 11,490 individuals*" and published in AJR Am. J. Roentgenol. 181:743-748). Different methods have been proposed for quantification of the mass of coronary calcium. However, these methods are threshold and protocol-specific, and may require calibration scans to obtain comparable measurements across different scanners and protocols and to correct for varying levels of arterial contrast enhancement (See e.g. Hong et al. (2002) in a paper entitled "*Coronary artery calcium: absolute quantification in nonenhanced and contrastenhanced multi-detector row CT studies*" and published in Radiology 223:474-480 and/or Rumberger et al. (2003) in a paper entitled "*A rosetta stone for coronary calcium risk stratification: Agatston, volume, and mass scores in 11,490 individuals*" and published in AJR Am J Roentgenol. 181:743-748). While these methods allow total mass quantification per vessel and per scan, they do not include a detailed analysis of the shape, size and distribution patterns of calcium fragments. Also, contrast-enhancement is required for reviewers to differentiate arterial lumen from thrombus and other soft tissue in CT of systemic arteries. This presents an additional problem, as enhancement reduces the apparent volume of calcium fragments, potentially reducing the accuracy of mass-quantification.

Calcium quantification in the systemic arteries, as opposed to coronary arteries, also presents a unique challenge of practicality. CT studies currently performed for quantifying calcification of the coronary arteries include less than 100 slices and take 10-15 minutes to process manually, CTAs currently consist of hundreds to thousands of images, and therefore take significantly longer.

Accordingly, it would be an advancement in the art to develop new methods of quantifying the mass and distribution of vessel calcification that obtains the true mass of calcium independent of the level of arterial contrast enhancement, without the requirement of protocol-specific or scanner-specific calibration scans, and allowing a detailed analysis of calcium distribution patterns.

SUMMARY OF THE INVENTION

The present invention provides a method that allows the quantification of the true mass of a calcium fragment located inside or outside a vessel as well as with respect to a systemic artery. The method is independent of the level of arterial contrast enhancement, does not require protocol-specific or scanner-specific calibration scans, and allows a detailed analysis of calcium distribution patterns. To achieve these advantages, the method first identifies one or more calcium fragments in an image. In a preferred embodiment, the images are obtained Computed Tomography Angiography. For each of the identified calcium fragments the average intensity and volume is determined as a function of a plurality of intensity thresholds. Using these determined values, brightness volume products are calculated, which are defined as the product of the average intensity and the volume. These products are determined for each of the plurality of intensity thresholds. The mass of a calcium segment is subsequently obtained from the calculated brightness volume products extrapolated at zero intensity and reference calcium parameters. In an additional embodiment, the mass and volume of one or more calcium fragments are visualized with respect to a vessel in a computer display.

BRIEF DESCRIPTION OF THE FIGURES

The objectives and advantages of the present invention will be understood by reading the following detailed description in conjunction with the drawings, in which.

DETAILED DESCRIPTION OF THE INVENTION

The present method requires either two-dimensional images or three-dimensional volume data sets acquired via computed tomographic angiography, MR imaging, or the like. The image(s) include(s) one or more vessels of interest that one would like to identify. Identification could for instance be accomplished by identifying the start and endpoints of the vessel(s) of interest. In a preferred embodiment for vessel identification the bony structures are excluded from the image. A previously developed method by the same group as the present invention is suitable (i.e. U.S. patent application Ser. No. 10/723,166 with filing date of Nov. 26, 2003 which is hereby incorporated by reference for all that it discloses). This method is preferred and capable of removing structures that possess the shape and intensity distribution characteristic of bone. The resulting image is left with vessel structures from which median centerlines can be obtained (See Paik et al. 1998 in a paper entitled "*Automated flight path planning for virtual endoscopy*" and published in Med. Phys. 25:629-637; this paper originates from the same group as the present invention). Paik's centerline method automatically produces an initial branching path on the surface of the segmentation, from start to endpoints. The centerline then undergoes an iterative medialization and smoothing process that corrects the initial path and the (user-) selected points to produce branched median centerlines through the vessels that define the course of the vessels to be processed.

It is noted that prior methods for quantifying vessel calcification used decision algorithms to differentiate vascular calcium fragments from other high-intensity structures (See e.g. Isgum et al. in a paper entitled "*Automatic detection of calcifications in the aorta from CT scans of the abdomen. 3D computer-aided diagnosis*" and published in Acad. Radiol. 11:247-257). The present invention, however, detects vascular calcium fragments by first generating a volume of interest (VOI) that defines the volume occupied by the selected arteries, while excluding other vessels and surrounding soft tissue. To accomplish this, a list of centerline points is obtained by sampling the median centerlines at sub-voxel intervals. At each of these points, the average luminal intensity and noise characteristics are measured to set an adaptive threshold. The perpendicular vessel cross-section in that slice is then segmented using the median centerline point as a seed point. The average size and shape of the previous five perpendicular cross-sections are used to constrain the segmentation from bleeding into adjacent veins or arterial branches. This is iterated for each point in the branching centerlines and the cross-sections were combined to obtain one composite segmentation termed the "luminal VOI".

Figure 1:
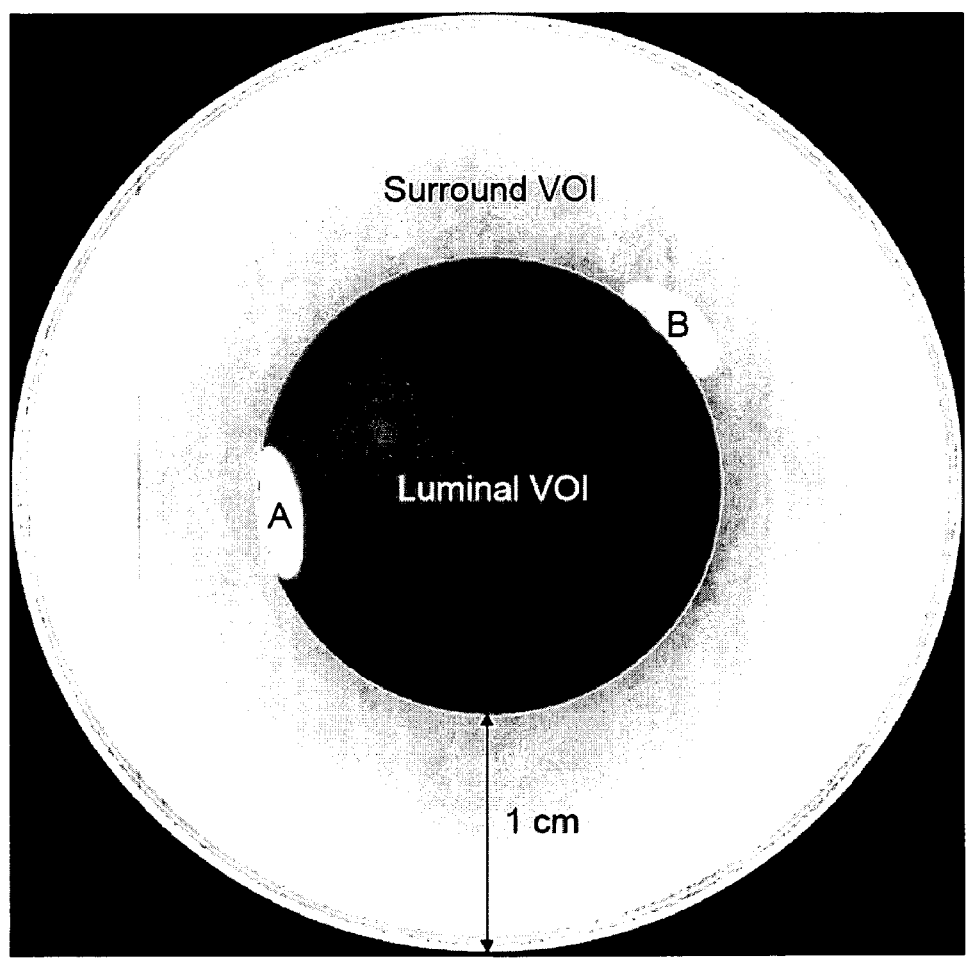
FIG. 1 shows a schematic diagram with a luminal and a surround VOI. The calcium containing voxels at A are defined to be mural calcium that project into the vascular lumen, while the calcium-containing voxels at B are defined to be calcium that are embedded intramurally.

The surface of this luminal VOI therefore defines the inner (luminal) wall of the vessels being analyzed (See FIG. 1). Subsequently, a vessel calcium detection threshold is set at intensity p standard deviations higher than the mean central vessel intensity. P could be in the range of 1 to 2.5. An optimal value for p that was found to exclude the most false positives was about 1.64. Voxels with intensity higher than the threshold and within the luminal VOI are extracted as mural calcium containing voxels that project into the vascular lumen. Voxels that are more than about 1 centimeter from the luminal edge of the vessel are rejected. In general, voxels about 0.5 to 3 cm from the luminal edge of the vessel could be rejected. Alternatively, the distance could be calculated from the diameter of the vessel. A preferred range of values would then be about 15% to 40% of the vessel diameter.

Subsequently, the voxels on the outer surface of the luminal VOI are sampled to calculate the mean intensity of mural tissue around the vessel lumen. Following this, a mural calcium detection threshold is set at an intensity q standard deviations higher than the mean mural tissue intensity. Q could be in the range of 0.7 to 2 or could be within the same range as p. An optimal value for q was about 1.64. It was found that lower values of q yield good results since the noise in the mural area (q) is usually less than in the lumen are (p). Voxels that are within 1 centimeter (generally 0.5 to 3 cm) of the outer surface of the luminal VOI is termed the "surround VOI". Again, alternatively, the distance could be calculated from the diameter of the vessel. A preferred range of values would then be about 15% to 40% of the vessel diameter. Voxels with intensity more than the detection threshold were extracted as calcium containing voxels that are embedded intramurally. All extracted voxels are then subjected to a connected component analysis to group them into connected calcium fragments, resulting in a plurality of calcium fragments. Fragments with 3 voxels or less are then excluded as being recognized as noise. In one aspect the user could be prompted to review the detected calcium fragments and delete erroneously included fragments, however this would not be necessary, since they could also be automatically verified and deleted.

Figure 2:
FIG. 2 shows maximum intensity projects (MIP) of aortic phantoms with other high intensity structures removed. All fragments (i.e. 28 in this example) were of irregular size and shape. These fragments represented a range of masses between 0.3 mg and 40 mg and were composed of materials with densities of 0.15, 0.3, and 0.45 mg/m$^3$.
Figure 3:
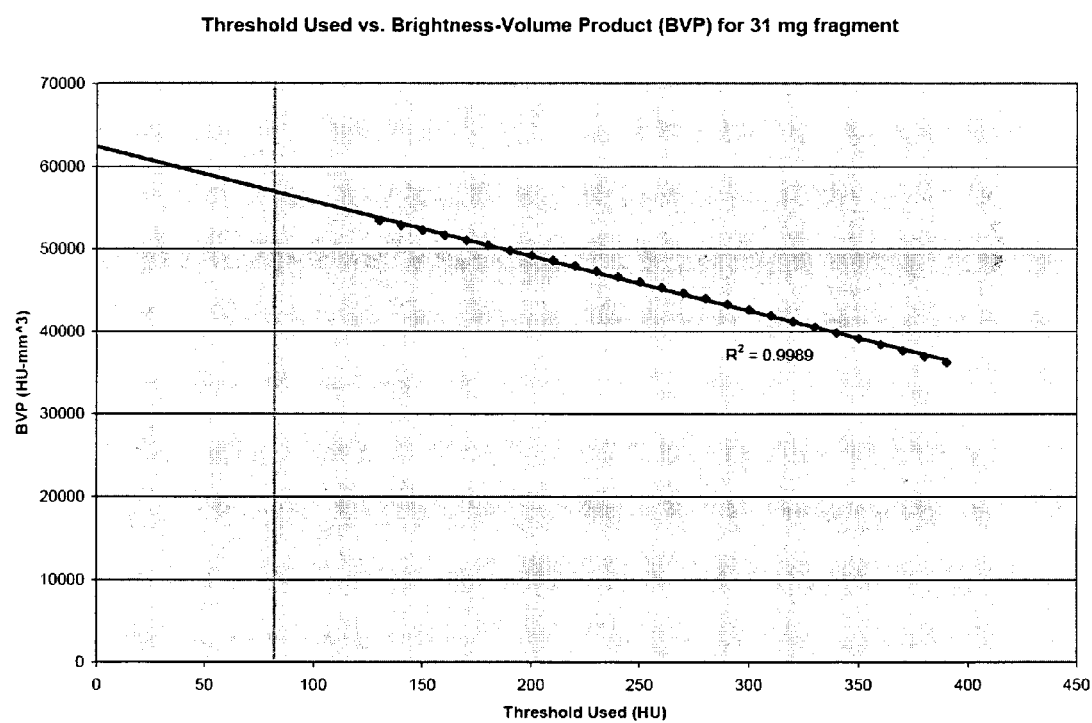
FIG. 3 shows an example of Brightness Volume Product (BVP) measured versus the threshold used to segment an example 31 mg fragment.
Figure 4:
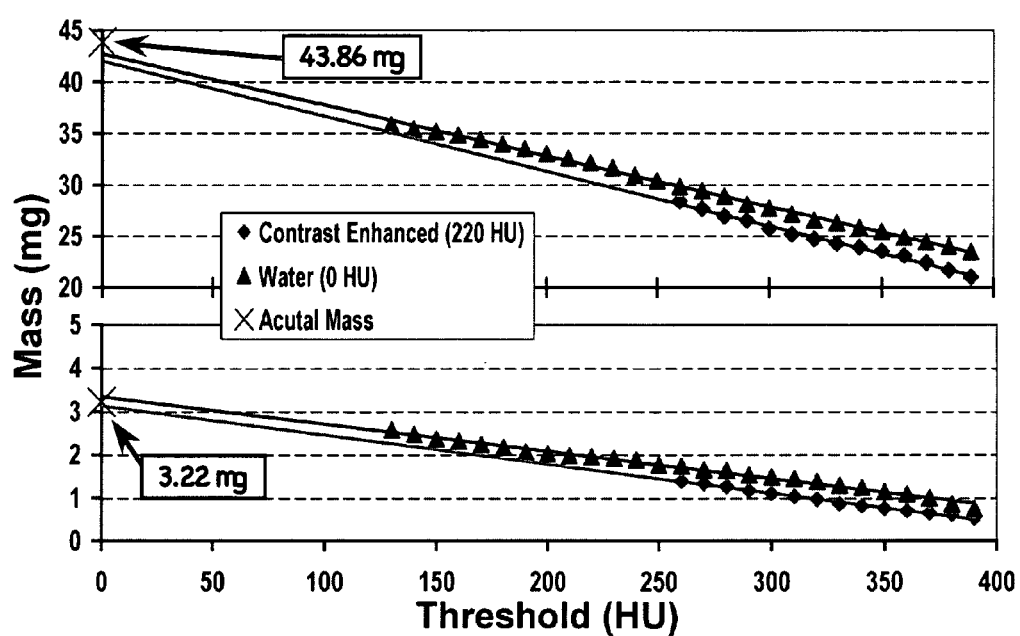
FIG. 4 shows examples of a determination using linear extrapolation to 0 HU for CaHA fragments with true mass of 43.86 and 3.22 mg. The triangle and diamond symbols correspond to measurements at a variety of segmentation thresholds above the background CT number applied to CT scans of the fragments in water and dilute iodine solution (225 HU) bathes, respectively. Linear extrapolation results in calculated values of 42.73 and 3.34 mg and 42.01 and 3.13 mg in water and dilute iodine, respectively (% error of 2.6, 3.8, 4.2, and 2.9, respectively).
Figure 5:
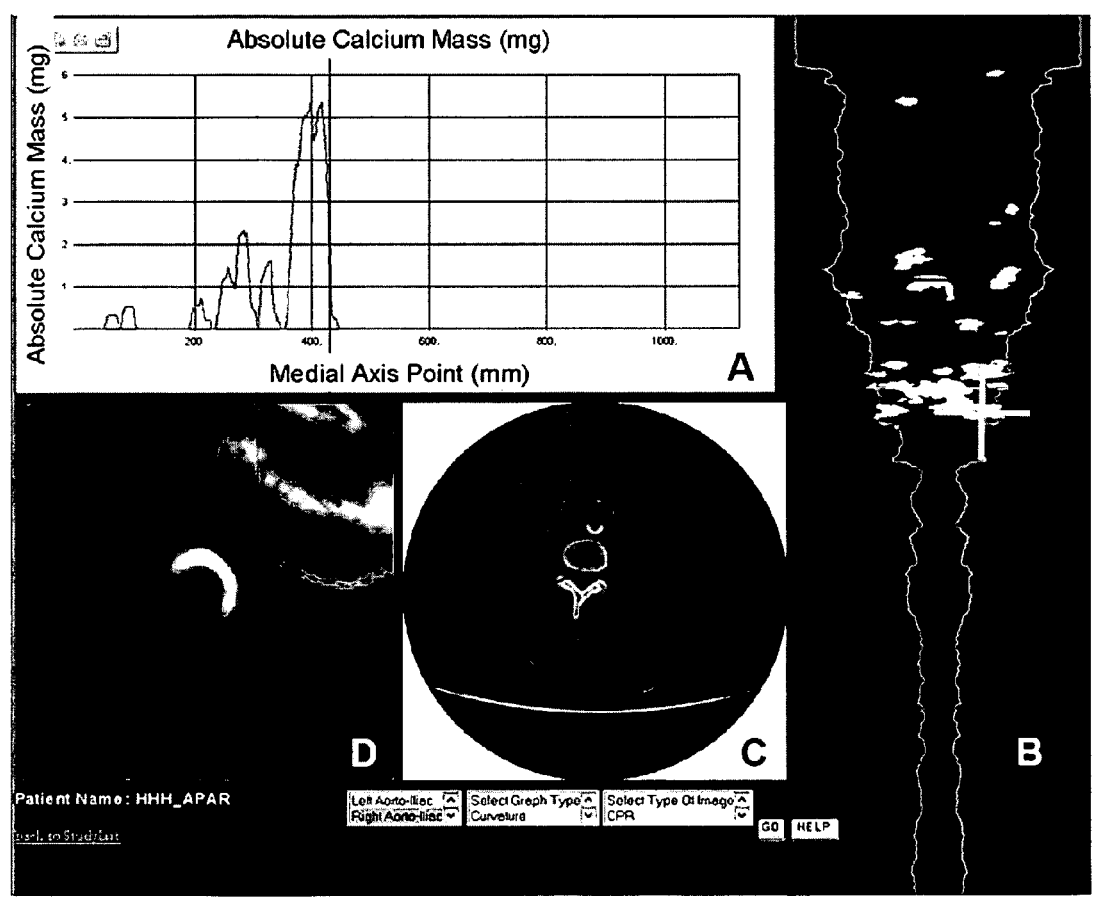
FIG. 5 shows an example of absolute calcium mass values along a vessel (A), an aorto-iliac calcium map (B), with perpendicular views (D) and axial slices (C).

The next step is to calculate the true mass for each of the identified calcium fragments. In one embodiment the Brightness Volume Product (BVP) for each fragment is calculated as the average intensity of the voxels in the fragment multiplied by the volume of the fragment. The BVP is calculated iteratively at thresholds between about 130 HU and 390 HU every 10 HU (See FIG. 2). Note different ranges and step sizes are also possible. In general, the smaller the step size, the more accurate the results. In other words, as a function of one or more threshold the average intensity of the voxels and volume is calculated for all those voxels above each of the threshold(s). If the fragment being analyzed is within the luminal VOI, the minimum threshold (lower bound) used is adaptively increased to exclude high intensity contrast material present in the lumen. From the (linear) series of BVP measurements thus obtained, a best-fit line is calculated and extrapolated to calculate the theoretical BVP that would be obtained at a threshold of 0 HU ($BVP_0$).

For example, the lower bound for deriving the graph could be set to be 10 HU above the average intensity of the background voxels. The upper bound could be set to 400. The mass/BVP is derived at intervals between the lower and upper bounds. Then the linear segment of the graph could be filtered. This linear segment usually starts at a HU value higher than the lower bound and lower than the upper bound. The graph is usually not linear at either end because near the lower bound, the threshold is low and so some background voxels are included. This would exponentially increase the apparent mass, making the graph nonlinear. Near the higher bound, the threshold is usually so high that only a few voxels of the fragment of calcium are segmented. Because only a few voxels are segmented, there are not enough samples to produce a linear plot. So once the linear segment is filtered, a best-fit line is approximated to the linear segment. Then the extrapolation is applied to find the true mass/BVP at a threshold of 0 HU. Since a threshold of 0 HU cannot be directly applied (the whole volume would be segmented)—the mass at a threshold of 0 HU can only be estimated by extrapolation.

To allow true fragment mass to be calculated from $BVP_0$ reference calcium parameters are determined and included. In one embodiment, reference calcium parameters could be obtained using a number of standards (e.g. 4) of known calcium density from 0 mg/ml (water intensity) to 200 mg/ml that are included in the scan field. Note that reference calcium parameters need not be done with every scan. They are specific to the scanner, and the scanner is regularly quality-checked to ensure that there is no drift. So they need to be done infrequently to make sure that the scanner is still calibrated properly. Since the mass standards are very small, they can also be inserted under the patient in every scan, if the user desires. If inserted into every scan, then there is no dependence on the quality control of the scanner.

The intensity in HU for each calcium standards was plotted against the density of the standards expressed in $mg/mm^3$. The gradient G of the best-fit line was used to derive the mass of each fragment from $BVP_0$ as follows:

$$\text{Mass(mg)} = G(\text{mgmm}^{-3}\,\text{HU}^{-1}) * BVP_0(\text{HU mm}^3).$$

The present invention has now been described in accordance with several exemplary, which are intended to be illustrative in all aspects, rather than restrictive. Thus, the present invention is capable of many variations in detailed implementation, which are considered to be within the scope and spirit of the present invention as defined by the following claims and their legal equivalents.

What is claimed is:

1. A method for quantifying calcification, comprising the steps of:
   (a) identifying a calcium fragment in an image;
   (b) determining the average intensity and volume for said calcium fragment as a function of a plurality of intensity thresholds;
   (c) calculating brightness volume products defined as the product of said determined average intensity and said determined volume for each of said plurality of intensity thresholds; and
   (d) obtaining the mass of said calcium segment from said calculated brightness volume products extrapolated at zero intensity and reference calcium parameters.

2. The method as set forth in claim 1, wherein said calcium fragment is identified inside a vessel or outside a vessel.

3. The method as set forth in claim 1, wherein said calcium fragment is identified with respect to a systemic artery.

4. The method as set forth in claim 1, wherein said image is obtained through Computed Tomography Angiography.

5. The method as set forth in claim 1, wherein said mass and said volume of said calcium fragment are visualized with respect to a vessel.

6. A method for determining and displaying calcium distribution patterns in a vessel, comprising the steps of:
   (a) identifying a plurality of calcium fragments in a vessel image;
   (b) determining average intensities and volumes for each of said calcium fragments as a function of a plurality of intensity thresholds;
   (c) calculating brightness volume products for each of said calcium fragments defined as the product of said determined average intensity and said determined volume for each of said plurality of intensity thresholds;
   (d) obtaining the mass of each of said calcium segment from said calculated brightness volume products extrapolated at zero intensity and reference calcium parameters; and
   (e) displaying said masses and volumes of said calcium fragments along with said vessel.

7. The method as set forth in claim 6, wherein said calcium fragments are identified with respect to a systemic artery.

8. The method as set forth in claim 6, wherein said image is obtained through Computed Tomography Angiography.

* * * * *